United States Patent [19]

Agrawal et al.

[11] Patent Number: 5,768,500

[45] Date of Patent: Jun. 16, 1998

[54] INTERRUPT-BASED HARDWARE SUPPORT FOR PROFILING MEMORY SYSTEM PERFORMANCE

[75] Inventors: Prathima Agrawal, New Providence; Aaron Jay Goldberg, Princeton; John Andrew Trotter, Chatham, all of N.J.

[73] Assignee: Lucent Technologies Inc., Murray Hill, N.J.

[21] Appl. No.: 749,043

[22] Filed: Nov. 14, 1996

Related U.S. Application Data

[63] Continuation of Ser. No. 262,404, Jun. 20, 1994, abandoned.

[51] Int. Cl.$^6$ .................................................. G06F 11/34
[52] U.S. Cl. .................... 395/184.01; 395/704; 371/21.1
[58] Field of Search .......................... 395/704, 184.01; 371/21.1

[56] References Cited

U.S. PATENT DOCUMENTS

| | | | |
|---|---|---|---|
| 3,868,480 | 2/1975 | Murgio et al. | 364/550 |
| 4,514,835 | 4/1985 | Böttigheimer | 368/118 |
| 4,528,553 | 7/1985 | Hasting et al. | 340/526 |
| 4,939,755 | 7/1990 | Alcita et al. | 377/39 |
| 5,355,487 | 10/1994 | Keller et al. | 395/704 |
| 5,446,876 | 8/1995 | Levine et al. | 395/184.01 |

OTHER PUBLICATIONS

Clements, "Microprocessor Systems Design", 1987 pp. 385–393.

Alan Mink et al.; Multiprocessor Performance–Measurement Instrumentation Computer Magazine; Sep. 1990; vol. 23, Issue 9; pp. 63–75.

T. A. Cargill et al., "Cheap Hardware Support for Software Debugging and Profiling", 1987, pp. 82–83.

Margaret Martonosi et al., "MemSpy: Analyzing Memory System Bottlenecks in Programs", *Performance Evaluation Review*, vol. 20, No. 1, Jun. 1992, pp. 1–12.

Jack E. Veenstra et al., "A Performance Evaluation of Optimal Hybrid Cache Coherency Protocols", *ASPLOS V Proceedings*, Oct. 12–15, 1992, pp. 149–160.

Scott McFarling, "Program Optimization for Instruction Caches", *ASPLOS–III Proceedings*, Apr. 3–6, 1989, pp. 183–191.

Allen D. Malony et al., "Performance Measurement Intrusion and Perturbation Analysis", *IEEE Transactions On Parallel and Distributed Systems*, vol. 3, No. 4, Jul. 1992, pp. 433–450.

Aaron J. Goldberg et al., "Mtool: An Integrated System for Performance Debugging Shared Memory Multiprocessor Applications", *IEEE Transactions on Parallel and Distributed Systems*, vol. 4, No. 1, Jan. 1993, pp. 28–40.

(List continued on next page.)

*Primary Examiner*—Parshotam S. Lall
*Assistant Examiner*—Kenneth R. Coulter

[57] ABSTRACT

Fueled by higher clock rates and superscalar technologies, growth in processor speed continues to outpace improvement in memory system performance. Reflecting this trend, architects are developing increasingly complex memory hierarchies to mask the speed gap, compiler writers are adding locality enhancing transformations to better utilize complex memory hierarchies, and applications programmers are re-coding their algorithms to exploit memory systems. All of these groups need empirical data on memory behavior to guide their optimizations. This paper describes how to combine simple hardware support and sampling techniques to obtain such data without appreciably perturbing system performance. By augmenting a cache miss counter with a compare register and interrupt line such that the processor is interrupted when the counter matches the compare value, we can sample system state and develop cache miss profiles that associate cache misses with specific processes, procedures, call stacks, addresses, or user defined aspects of system state. This idea is implemented in the Mprof prototype that profiles data stall cycles, first level cache misses, and second level misses on the sun Sparc 10/41. Simple case studies are provided to illustrate Mprof's features.

15 Claims, 3 Drawing Sheets

OTHER PUBLICATIONS

Daniel Lenoski et al., "The DASH Prototype: Logic Overhead and Performance", 1993, IEEE.

Edward Rothenberg et al., "Techniques for Improving the Performance of Sparse Matrix Factorization on Multiprocessor Workstations", *Proceedings Supercomputing '90*, Nov. 12–16, 1990, pp. 232–241.

David Callahan et al., "Analyzing and Visual Performance of Memory Hierarchies", *Performance Instrumentation and Visualization*, Chapter 1, pp. 1–26.

Michael E. Wolf et al., "A Data Locality Optimizing Algorithm", *Sigplan Notices*, vol. 26, No. 6, Jun. 1991, pp. 30–44.

Steven McCanne et al., "A Randomized Sampling Clock for CPU Utilization Estimation and Code Profiling", *1993 Winter USENIX*, Jan. 25–29, 1993, pp. 387–394.

"Measurement Techniques", Chapter 2, pp. 26–99.

Robert J. Hall et al., "Call Path Profiling of Monotonic Progam Resources in UNIX", *1993 Summer Usenix*, Jun. 21–25, 1993, p. 1–13.

Karl Pettis et al., "Profile Guided Code Positioning", *Sigplan Notices*, vol. 25, No. 6, Jun. 1990, pp. 16–27.

Anant Agrawal et al., "ATUM: A New Technique for Capturing Adress Traces Using Microcode", *Proceedings of 13th Annual International Symposium on Computer Architecture*, 1986, pp. 119–127.

David R. Cheriton et al., "Restructuring a Parallel Simulation to Improve Cache Behavior in a Shared–Memory Multiprocessor: The Value of Distributed Synchronization", *Proceedings of the International Symposium on Shared Memory Multiprocessing*, 1991, pp. 109–118.

P. Magnusson et al.; Efficient Memory Simulation in SimICS; Proceedings of 28th Annual Simulation Symposium; pp. 62–73, Apr. 1995.

M. Martonosi et al.; Tuning memory Performance of Sequential and Parallel Programs; pp. 32–40, Apr. 1995.

A. Goldberg et al.; Mtool: An Integrated System for Performance Debugging Shared Memory Multiprocessor Applications; IEEE Transactions on Parallel and Distributed Sys. vol. 4, No. 1; pp. 28–40, Jan. 1993.

INTERRUPT-BASED HARDWARE SUPPORT FOR PROFILING MEMORY SYSTEM PERFORMANCE

This is a Continuation of application Ser. No. 08/262,404 filed Jun. 20, 1994, now abandoned.

BACKGROUND OF THE INVENTION

1. Field of the Invention

The present invention relates generally to computer performance optimization and, more particularly, to performance profiling of computer systems.

2. Related Art

Fueled by higher clock rates and superscalar technologies, growth in processor speed continues to outpace improvement in memory system performance. Reflecting this trend, various techniques have been implemented to compensate for this lag in performance. One technique, implemented by computer system architects, is the development of increasingly complex memory hierarchies to mask the lag in memory system performance. Another technique, implemented by compiler writers, is the addition of localityenhancing transformations to better utilize complex memory hierarchies. Still another technique, implemented by applications programmers, is the re-coding of algorithms to exploit memory systems.

All of the above techniques require empirical data on memory system behavior to guide the particular optimization. Presently, there are a number of microprocessor and workstation vendors who provide hardware support for profiling memory system performance to meet this need for empirical data. For example, the Intel Pentium microprocessor as well as the Sun ECache (external cache) controller in the Sun Sparc 10's and SparcCenter 1000's, feature cache miss count registers.

While these simple counters provide a first step toward understanding memory system utilization, there are a number of drawbacks in utilizing cache miss count registers. In particular, simple cache miss counters do not directly relate cache behavior to the specific portion of the software which is incurring cache misses. Instead, they only indicate the aggregate number of misses. This information, however, will not show which process, procedure, or data structure was responsible for the misses.

What is needed, therefore, is a means for obtaining memory system performance data to develop cache miss profiles that associate cache misses with specific processes, procedures, procedure call stacks, and user defined aspects of the system state without interfering with system performance.

SUMMARY OF THE INVENTION

The present invention is a system and method for profiling computer systems. The present invention is an implementation of a system profiler that samples system state using interrupts generated by a cache miss counter supplemented with a compare register and interrupt line.

One advantage of the present invention is that it has the ability to interrupt the processor when the cache miss count matches a predetermined value stored in the compare register. This improvement over conventional approaches enables the present invention to sample the state of the processor at a predetermined number of cache misses or cache stall cycles. The present invention is then able to develop a cache miss profile that associates cache misses with specific processes, procedures, procedure call stacks, or even user defined aspects of system state.

Another advantage of the present invention is its ability to provide significant assistance in isolating performance bottlenecks and guiding optimization of architectures, operating systems, compilers, and applications.

Still another advantage of the present invention is the implementation of a sampling approach that offers a better compromise between speed, accuracy, flexibility, portability, and extensibility than previous hardware and software methods for understanding memory system performance.

Further features and advantages of the present invention, as well as the structure and operation of various embodiments of the present invention, are described in detail below with reference to the accompanying drawings.

BRIEF DESCRIPTION OF THE FIGURES

In the drawings, like reference numbers indicate identical or functionally similarly elements. Additionally, the leftmost digit of a reference number identifies the drawing in which the reference number first appears. The present invention will be described with reference to the accompanying drawings, wherein.

DETAILED DESCRIPTION OF THE PREFERRED EMBODIMENTS

A. Introduction

Figure 1:
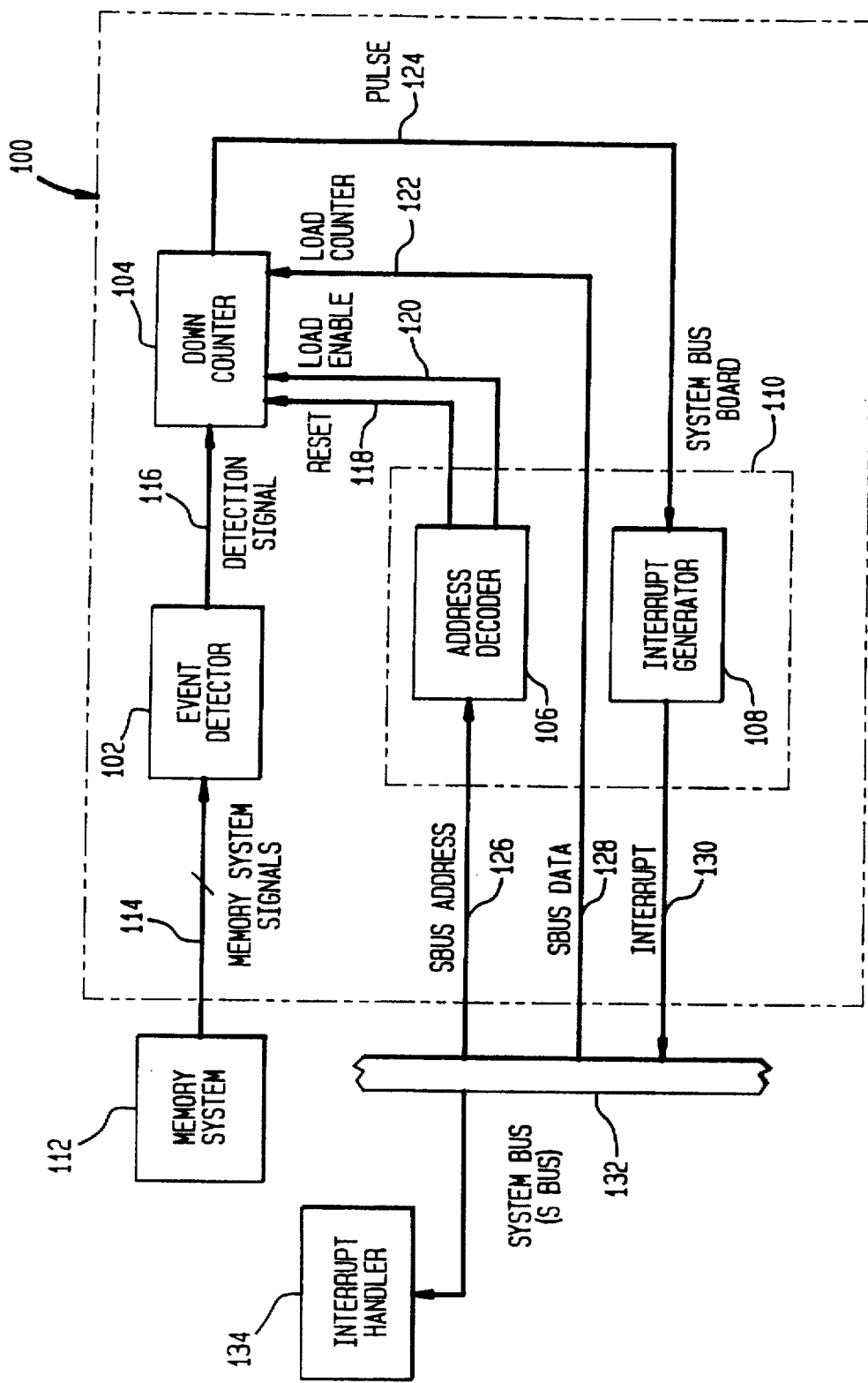
FIG. 1 is a block diagram of the preferred embodiment of the interrupt-based hardware support system of the present invention.

The present invention is a system and method for profiling computer system performance. The present invention may be implemented as a memory system profiler, referred to as Mprof, that samples system state using interrupts generated by a loadable decrementer cache miss counter supplemented with a compare register and interrupt line.

First, the use of memory system profiling and the reasons why conventional approaches for understanding memory system performance are inadequate are discussed. Then, the application of the present invention to profiling memory systems is given, with the preferred hardware implementation and alternative embodiments. Last, case studies are provided to illustrate how the profiles can be used to optimize applications for the cache hierarchy of a Sparc 10/41.

B. Uses of Memory Profiles

Memory system profiles can provide significant assistance in isolating performance bottlenecks and guiding optimization of architectures, operating systems, compilers, and applications. Memory systems with multilevel cache hierarchies, write buffers, instruction prefetch units, banked memories, and sophisticated interconnection networks are becoming commonplace.

Commodity personal computers feature primary and secondary caches while cache-coherent multiprocessors are marketed as "desktop" workstations. The complex memory hierarchies in these systems are designed by architects who identify the memory reference characteristics of important benchmark applications and optimize the memory system to deliver performance for these key programs.

Once the architect has optimized the memory hierarchy for specific reference patterns, it is up to software developers to try to coerce applications into generating these patterns. Recent work has demonstrated that compiler transformations can increase data cache utilization by reordering and blocking loop nests, hide memory latency by carefully prefetching data before it is needed, and improve instruction cache performance by reordering basic blocks. For a discussion of compiler transformations which can increase data cache utilization by reordering and blocking loop nests see Wolf et al., "A Data Locality Optimizing Algorithm," in Proceedings of the ACM '91 Conference on Programming Language Design and Implementation (1991), pp. 30–44, herein incorporated by reference in its entirety. For a discussion of compiler transformations which can hide memory latency by carefully prefetching data before it is needed see Mowry, et al., "Design and Evaluation of a Compiler Algorithm for Prefetching," in Proceedings of the Fifth International Conference on Architectural Support for Programming Languages and Operating Systems (1992), pp. 62–73, herein incorporated by reference in its entirety. For a discussion of compiler transformations which can improve instruction cache performance by reordering basic blocks see McFarling, S., "Program Optimization for Instruction Caches," in Proceedings of the Third ASPLOS (1989), pp. 183–93; Pettis et al., "Profile Guided Code Positioning," in Proceedings of the ACM '90 Conference on Programming Language Design and Implementation (1990), pp. 16–27, herein incorporated by reference in its entirety.

Other work has shown that cache coherence traffic in shared memory multiprocessors can be reduced by supporting multiple coherence protocols and letting the compiler or operating system choose the most efficient protocol on a per page basis. See, for example, Veenstra et al., "A Performance Evaluation of Optimal Hybrid Cache Coherency Protocols," in Proceedings of the Fifth International Conference on Architectural Support for Programming Languages and Operating Systems (1992), pp. 149–60, herein incorporated by reference in its entirety. Moreover, many of the researchers developing software techniques for enhancing memory system utilization have explicitly noted that memory overhead profiles could be productively used to guide compilers in automatically applying their transformation. See, Mowry, et al., "Design and Evaluation of a Compiler Algorithm for Prefetching," in Proceedings of the Fifth International Conference on Architectural Support for Programming Languages and Operating Systems (1992), pp. 62–73; and Veenstra et al., "A Performance Evaluation of Optimal Hybrid Cache Coherency Protocols," in Proceedings of the Fifth International Conference on Architectural Support for Programming Languages and Operating Systems (1992), pp. 149–60 both of which are herein incorporated by reference in their entirety.

Finally, there is a large literature on rewriting applications to enhance locality and improve memory system performance. See, for example, Cheriton et al., "Restructuring a Parallel Simulation to Improve Cache Behavior in a Shared Memory Multiprocessor: A First Experience," in Proceedings of the International Symposium on Shared Memory Multiprocessing, (1991) pp. 109–118, herein incorporated by reference in its entirety. See also, Rothberg et al., "Techniques for Improving the Performance of Sparse Matrix Factorization on Multiprocessor Workstations," in Proceedings of Supercomputing '90 (1990), pp. 232–41, herein incorporated by reference in its entirety. Given the existence of locality enhancing transformations, programmers need profiling tools to identify where a bottleneck is in the memory system and to quantify the extent of the bottleneck and to measure how transformations actually impact performance.

C. Memory Profiling Techniques

The extensive set of applications for memory profiles described above has driven the development of several memory system profilers. These conventional memory profiles may be divided into three techniques or methods: (1) simulation-based techniques, (2) counter-based systems, and (3) software methods.

In simulation memory profiles, a memory reference trace of a program or set of programs is obtained, either by software instrumentation, microcode monitoring, or hardware reference tracing. An example of the software instrumentation approach may be found in Callahan et al., "Analyzing and Visualizing Performance of Memory Hierarchies," in Performance Instrumentation and Visualization, Simmons et al., Addison Wesley (1990), pp. 1–26, herein incorporated by reference in its entirety. An example of the microcode monitoring approach may be found in Agarwal et al., "New Technique for Capturing Address Traces Using Microde," in Proceedings of Thirteenth Annual International Symposium on Computer Architecture, (1986), pp. 119–27, herein incorporated by reference in its entirety. An example of the hardware reference tracing approach may be found in Lenoski et al., "The DASH Prototype: Logic Overhead and Performance," in IEEE Transactions on Parallel and Distributed Systems (1993), vol. 4, no. 1, pp. 41–61, herein incorporated by reference in its entirety.

Once the memory reference trace of a program or set of programs is obtained in simulation memory profiles, the trace is then fed into an instrumented memory system simulator. The primary problem with simulation memory profiles is that it is slow, often increasing execution time by factors of 100–1000. The speed problem is exacerbated by the increasing complexity and size of modern memory systems. For example, the number of memory references needed to simulate the performance of a typical shared bus multiprocessors with 1–30 processors and 1–16 megabyte second level caches on each processor is large enough to make this approach impractical.

Because simulation is so slow, it is used primarily by architects to predict the performance of systems that cannot be measured because they have not yet been built. Yet, precisely because simulation is expensive, it is crucial that before simulating architects narrow the design space as much as possible by fully understanding the performance of today's systems. As mentioned above, to develop such an understanding, designers are including hardware for measuring cache miss rates and bus utilizations. The drawback of this counting hardware is that it does not give any direct insight into which interactions between the software and memory hierarchy lead to poor performance.

In order to establish a correspondence between hardware event counters and program events, software instrumentation must be added to access the counters. For example, the number of cache misses that occur can be measured in a procedure and on its behalf by reading the cache miss counter on entry and exit to the procedure and recording the difference in the counter value. However, this software technique has two important shortcomings. First, the instrumentation may perturb the system which is being measured. For a short procedure, the overhead of reading several hardware counters (e.g., read miss, write miss, bus utilization) on entry and exit and storing the totals may exceed the work actually done in the procedure. Second, if a context switch occurs between procedure entry and exit, the counter totals will include misses created by other processes.

Progress has been made in addressing some aspects of these shortcomings using model-based techniques to compensate for perturbation, adaptive instrumentation methods to reduce monitoring overhead, and operating systems support to create virtual per-process counters. For a discussion of the shortcomings in using model-based techniques to compensate for perturbation, see Malony et al., "Performance Measurement Intrusion and Perturbation Analysis," in IEEE Transactions on Parallel and Distributed Systems (1992), vol. 3, no. 4, pp. 433–50, herein incorporated by reference in its entirety. For a discussion of adaptive instrumentation methods to reduce monitoring overhead, see Reed et al., An Overview of the Pablo Performance Analysis Environment, Dept. of Computer Science, U. of Illinois, Unpublished Manuscript, (1992), herein incorporated by reference in its entirety.

However, there remains a fundamental intrusiveness problem whenever software instrumentation is inserted into frequently accessed regions of a program to gather fine-grained profiles using hardware counters. To get a sense of the magnitude of the resulting overhead of such a technique, the SPEC integer benchmarks are instrumented to access counters on procedure entry and exit. The overhead is measured in terms of impact on execution time. In practice, both a memory overhead profile and an execution time profile in a single run of the program, so perturbing execution time directly impacts the profile data. Also, it is expected that the profiling techniques will be applied to multithreaded programs where program behavior is highly dependent on the relative execution times of the threads. Therefore, monitoring techniques that impact execution time significantly will be suspect.

In order to measure overhead, the integer SPEC benchmarks are instrumented to record the dynamic number of procedure calls and the user mode execution time of each program. Given these statistics, and assuming the counter code at procedure entry and exit takes a fixed amount of time to execute, counter overhead can be estimated by:

2*(dynamic # of procedure calls) * (time for a counter execution)

It should be noted that this formula is conservative because it ignores several potential sources of overhead. For example, inserting counter code will expand the size of the executable, potentially degrading instruction cache performance. In addition, if the counters are inserted by the compiler, they will interact in an unpredictable way with the optimizer, affecting register allocation, instruction scheduling, and other optimizations.

Subject to these caveats, the above formula can be used to estimate overhead given a value for counter execution time. A generic counter update on procedure entry is represented by the pseudo-code:

Count__Array[Procedure__Index]-=Read__Stall__Cycle__Counter

The procedure exit code is similar, with the subtraction replaced by addition. The time to execute the pseudo-code can then be divided into counter update bookkeeping time and counter access time. On a RISC architecture, the update to the array involves at least a load, an add, and a store. In addition, to avoid multiple counter updates within a single recursive call, the update code must be protected with a counting semaphore. We refer to the cost of the counting semaphore and the counter update code as counter bookkeeping. On the Sparc 10/41 where the measurements were made, counter bookkeeping takes about 10 cycles at 40 Mhz or 0.25 microseconds. The cost of counter access is implementation dependent. If the counter is integrated on-chip with the microprocessor, it may cost only a cycle to access. If, on the other hand, the counter is implemented externally using a system bus (SBus) card, it takes around 30 cycles to read on the Sparc 10/41. Table 1 below illustrates the overhead results under these two assumptions about access time.

TABLE 1

| | | Instrumentation Overhead | | | | | |
|---|---|---|---|---|---|---|---|
| | | Book-keeping | Access Overhead (sec.) | | Run | % Overhead | |
| Program Name | Dynamic Calls | Overhead (sec.) | 1 Cycle | 30 Cycle | Time (sec.) | Fast | Slow |
| xlisp | 161206522 | 80.6 | 8.1 | 241.8 | 195.4 | 45 | 165 |
| gcc (ccl) | 58477688 | 29.2 | 2.9 | 87.7 | 129.6 | 25 | 90 |
| espresso | 17668163 | 8.8 | 0.9 | 26.5 | 57.1 | 17 | 62 |
| sc | 1749875 | 0.9 | 0.1 | 2.6 | 12.5 | 8 | 28 |
| eqntott | 4363768 | 2.2 | 0.2 | 6.5 | 32.4 | 7 | 27 |
| compress | 251472 | 0.1 | 0.0 | 0.4 | 2.4 | 6 | 21 |

Referring to Table 1, it can be seen that even with single cycle counter access, some programs experience 45% overhead; with slow counter access programs execute at 1.21 to 2.7 time their uninstrumented speed. Also, it should be noted that the problem becomes more acute when we move from procedure level profiling to finer grained profiling of individual basic blocks or load instructions. In general, hardware counters do not seem to support non-intrusiveness, fine grained profiling.

There is an alternative approach to profiling, referred to as Mtool, that retains the speed of run-time monitoring without requiring hardware instrumentation on the memory system. Mtool isolates memory overhead by comparing the actual execution time of a program segment against the ideal execution time predicted assuming that all memory references are cache hits. For a further discussion of Mtool, see Goldberg et al., "Mtool: An Integrated System for Performance Debugging Shared Memory Multiprocessor Applications," in IEEE Transactions on Parallel and Distributed Systems (1993), vol. 4, no. 1, pp. 28–40, herein incorporated by reference in its entirety. While this approach allows Mtool to quantify memory overhead on a per second basis, it does not provide information on what aspect of the memory hierarchy is being poorly utilized. For example, Mtool does not distinguish overhead due to primary instruction cache misses from overhead due to second level cache misses from write buffer stalls. From an optimizer's perspective, distinguishing the individual sources of performance loss is critical to identifying appropriate performance improving transformations.

Thus, previous memory system profilers have significant shortcomings that discourage their widespread use: simulation is too slow, hardware counters must be accessed via potentially intrusive software instrumentation, and software techniques like Mtool do not identify what part of the memory hierarchy is a bottleneck. These shortcomings have been alleviated with the sampling-based profiler of the present invention.

D. Sampling-Based Profilers

Sampling techniques are routinely used to build execution time profilers and are well known to those skilled in the relevant art. Time profilers rely on an external timer to generate a clock interrupt. The interrupt is fielded by a handler that samples the system state, building up a statistical profile of where the system spends its time. For example, most UNIX implementations use the system timer interrupt to support a per process, program counter sampling service that is accessed via the profile system call and the prof tool. When the timer interrupt is serviced, if the interrupted process has requested profiling (with the profile call), then a counter associated with the process' program counter is incremented. The program counter counts are then post-processed by prof to produce a table of per procedure execution times.

Assuming that the sampling is independent of the program execution, the sampled profile will provide a good estimate of the actual execution time spent in each procedure. A detailed discussion of the statistical significance of sampled profiles can be found in Ferrari, D., Computer Systems Performance Evaluation, Prentice-Hall Inc., Englewood Cliffs, NJ (1978), Chapter 2, herein incorporated by reference in its entirety. A description of a robust UNIX implementation of code profiling is given in McCanne et al., "A Randomized Sampling Clock for CPU Utilization Estimation and Code Profiling," in Proceedings of 1993 Winter USENIX (1993), herein incorporated by reference in its entirety.

Moreover, because the sampling rate is relatively low (usually about 60 samples per second for execution time profilers), sampling is less intrusive than inline software instrumentation. And finally, sampling techniques are not limited to execution time profiling. Hall et al., "Call Path Profiling of Monotonic Program resources in UNIX," in Proceedings of 1993 Summer USENIX (1993), describes a sampling-based profiler, Cpprof, which uses information provided by the UNIX System V/proc interface to profile with respect to a wide variety of system events including page faults, floating point exceptions, and bytes read or written. Some previous hardware instrumentation has also supported profiling via sampling. In Cargill et al., "Cheap Hardware Support for Software Debugging and Profiling," in Proceedings of the Second International Conference on Architectural Support for Programming Languages and Operating Systems, (1987), pp. 82-3, for example, it is suggested that interrupts generated by a unit that counts instruction fetches to drive code profiling be used.

Another potential instance of interrupt-based profiling can be found in DEC's 21064 implementation of the Alpha architecture. This microprocessor includes two flexible performance counting registers that can be programmed to increment on a variety of events, generating an interrupt every $2^8$, $2^{12}$, or $2^{16}$ events. These events include misses in the on-chip instruction and data caches. However, the performance counters are apparently intended as a means of counting events over a long period of time relative to the event frequency. See, for example, Digital Equipment Corporation, DECChip 21064-AA Microprocessor Preliminary Data Sheet. Maynard, MA (1992) pp. 3.20–3.22, herein incorporated by reference in its entirety. While the chip architects may have had simple aggregate counts in mind, the same interrupting mechanism can be used to build powerful sampling based profiling environments. Note that the 21064 mechanisms is not ideal because it lacks fully programmable compare registers. This limitation prevents one from randomizing the sampling interval to insure statistical significance. Nevertheless, the profiling support in DEC's 21064 is evidence that vendors can implement sampling-based profiling in production systems.

Below, the requirements for the present invention are made explicit in the description of the preferred embodiment of the present invention. This embodiment counts primary and secondary cache misses and CPU data stall cycles. Alternative embodiments could easily be used to monitor other events like cache service time, TLB misses and write buffer stalls.

E. Hardware Sampling Implementation

1. Introduction

A basic problem in both debugging and performance profiling of systems such as those with multiple processors is monitoring the system without disturbing its operation. The present invention solves this problem by providing specialized hardware for monitoring certain operations of a processor and then interrupting the processor to record its state when the specialized hardware detects a predetermined condition. For example, a hardware timer interrupts the processor when waiting time at a particular address exceeds a preset threshold. In another example, multiple counters accumulate occurrences of waits in specified time ranges and interrupt the processor when one of the counts reaches a specified value.

Hardware monitors can track many aspects of memory system behavior. For example, by monitoring the external pins of a microprocessor that has an on-chip cache, it is usually straight-forward to detect misses in that cache. And, if the monitor is fabricated as part of the microprocessor (as in the Pentium and Alpha), misses in split on-chip can be identified as instruction or data misses. Regardless of the implementation of the event detector, the detection signal can be fed to a counter that triggers an interrupt when the count reaches a particular value. An interrupt handler can then record the state of the running system. If enough samples are recorded, this information will highlight the parts of a program or programs that are causing cache misses.

Referring to FIG. 1, the performance monitor of the present invention is now described. The performance monitor 100 of the present invention consists of three main components: an event detection module 102, a loadable down-counter 104, and an interrupt generator 108. The event detection module 102 generates a pulse every time an event of interest occurs. The down-counter 104 counts the pulses generated by event detector 102 and causes interrupt circuitry 108 to generate an interrupt once the counter reaches zero. The initial counter value can be loaded so that an interrupt will be generated after the occurrence of a programmable number of events; this allows randomized sampling intervals to be used. In addition, by selecting an appropriate value for the loadable counter, relatively infrequent events will still interrupt the CPU a statistically significant number of times. The interrupt generator 108 implements the correct interface to generate CPU interrupts so the interrupt handler can record appropriate system state. In the preferred embodiment, performance monitor 100 utilizes programmable array logic (PAL) on an SBus card 110 to implement the event detector 102, down counter 104, and interrupt generator 108.

2. The Implementation of the Present Invention

Referring to FIG. 1, the present invention is implemented to monitor the behavior of memory system 112 of a Sun SPARC 10/41 workstation. The SPARC 10/41 offers an on-chip cache (split 10KB instruction and 16KB data) backed by an integrated 1MB second level cache which is connected to the main memory via a cache controller and a memory bus (MBus).

For primary cache misses, event detection circuit 102 detects a cache line read by monitoring several pins on the SRAM's of the second level cache that service the primary cache misses. This is represented by memory system signals 114 output by memory system 112. To detect second level cache misses, the event detector 102 monitors the memory bus (MBus) and outputs detection signal 116 on main memory reads received over memory system signal line 114. To properly monitor these main memory read signals, the present invention requires state information since MBus memory accesses use several bus cycles. The event detector 102 may also detect data cache stall time by exploiting an external monitoring pin on the SuperSparc microprocessor that is active when the CPU pipeline is waiting on the data cache. This is also received via memory signal system line 114. In the preferred embodiment of the present invention, event detection circuit 102 is implemented in a PAL. However as one skilled in the relevant art would find apparent, detector 102 may be implemented in other types of hardware configurations.

Down counter 104 receives a detection signal generated by event detector 102 via detection signal line 116. Down counter 104 outputs a pulse on signal line 124 to interrupt generator 108 when a predetermined number of events has occurred. In the preferred embodiment of the present invention, down counter 104 is implemented using two PALs and is 20 bits deep. This enables performance monitor 100 to count up to $2^{20}$ events before a pulse is sent via pulse line 124 to interrupt generator 108. The interrupt generator 108 is implemented on an SBus card 110 and causes an SBus interrupt to occur on interrupt line 130 when it receives a pulse from down counter 104 via signal line 124. Thus, loadable down counter 104 and interrupt generator 108 of the present invention replace the simple cache miss counter used in conventional systems. Downcounter 104 includes a bit which indicates that the performance monitor system 100 generated the interrupt 130 and provides a register for clearing the interrupt. The SBus interface 132 is also used to reset and enable counter 104 via reset line 118 and load enable line 120, respectively. In addition, the SBus interface is used to load counter 104 with a predetermined value via an SBUS data line 128 which is passed through SBus board 110 and provided to the down counter 104 via load counter line 122. Down counter 104 generates a pulse on line 124 when the loaded number of detection signals received via detection signal line 116 is reached. In other words, the processor is interrupted when the cache miss count reaches zero.

Figure 2:
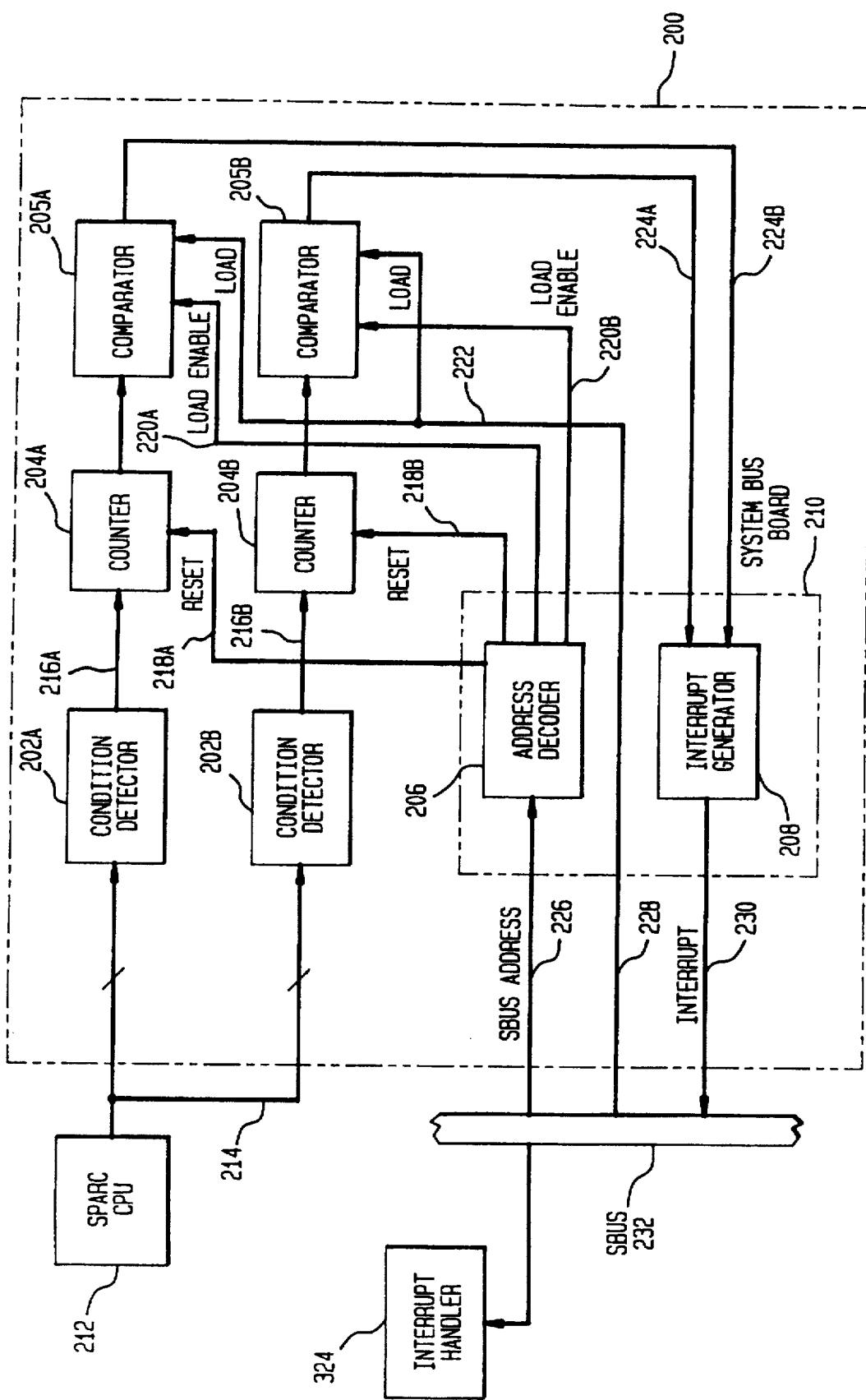
FIG. 2 is a block diagram of the alternative embodiment of the interrupt-based hardware support system of the present invention.

Referring to FIG. 2, an architectural block diagram of another preferred embodiment of the present invention is illustrated. Note that in the performance monitor 200 down counter 104 of FIG. 1 has been replaced with a counter 204A and loadable compare register 205A to make the circuit more flexible.

This embodiment supports simultaneous profiling of primary and second level cache misses. This embodiment is an extension of the embodiment illustrated in FIG. 1. The components of performance monitor 200 are implemented in field programmable gate arrays (FPGA) rather than PALs. By using an FPGA, it is possible to reconfigure the monitor circuit from software, allowing us to easily reprogram the monitor to trigger on different events or sets of events which cause memory bottlenecks and as a result, degrade system performance (i.e., perfomance degrading memory events). The FPGA is integrated on an SBus board 210 with external probes, thereby providing a flexible monitoring architecture that can trigger on conditions involving state or detect accesses to specific address ranges (for example, I/O devices). The FPGA implements several separate counters 204A and 204B so that several distinct event classes can be monitored simultaneously, including primary and secondary level cache misses and data cache stall time. When any of the counters 204A,204B matches its compare value stored in the respective comparator 205A,205B, an interrupt is raised. That is, an interrupt is generated by the respective comparator 205A,205B over interrupt lines 224A,224B, respectively. The interrupt status bits indicate which of the monitored events caused the interrupt.

F. Recording System State

Upon receiving a profiling interrupt from the performance monitor of the present invention via SBus 132 or 232, the operating system and user application cooperate with the present invention to record profile data. Ideally, the present invention would sample enough system state to precisely identify the nature of every memory system bottleneck. In practice, the precision with which the sampled data describes the bottleneck must be balanced against the overhead of collecting large amounts of data. For example, while it may be desirable to know the state of a complex data structure when state is sampled, it is prohibitively expensive for a general purpose profiler to make a full dump of a process'data segment on each profiling interrupt.

The performance monitor of the present invention supports two data collection mechanisms that represent alternative trade-offs between flexibility, precision of information, and overhead. The most flexible and least expensive mechanism is system wide sampling. When system-wide profiling is enabled, each time a sampling interrupt occurs, the handler appends a brief sampled state record to a kernel profiling buffer. The record typically contains information such as:

(Timestamp, Current Process Id, Processor Status Word, Current Program Counter Value).

A user-level daemon periodically copies the profiling buffer to user space and saves its contents to a file. Post mortem tools can then synthesize cache miss profiles on a per-process basis, reporting user and system mode cache misses and plotting (using the timestamp data) cache miss samples versus time. In addition, if a mapping between Process IDs and corresponding executable files is maintained, the executables symbol tables may be used to synthesize UNIX prof style profiles that give cache miss counts on a per procedure basis.

The drawback of system wide sampling is that it provides only process and procedure-level information about the conditions under which cache misses are occurring. A preferred approach is the more flexible user level profiling implemented with software signals. In user level profiling, an application opens a special sampling device to indicate to the interrupt handler located in the processor that it wishes to receive memory system sampling signals. When a sampling interrupt occurs, the interrupt handler checks whether the currently executing process has opened the sampling device, and if so, it posts a signal to the process. When the kernel goes to resume the user process, it notices the posted signal and arranges to restart the process in the signal handler that the user process has registered for the sampling signal. This handler records relevant aspects of the process state and then control returns to the process' previously executing thread of execution. Note that this technique is not as non-intrusive as system-wide sampling because invoking the signal handler and resuming the previous thread of control involves extra overhead. However, as long as the sampling rate is not too high, the extra overhead will still be negligible.

The default interface to user level sampling in Mprof requires an application to be linked with a special library that replaces the default start and exit routines. The new start routine installs a sampling signal handler and opens the sampling device while exit writes the profile out to a file. (This library interface resembles linking with the —p flag to enable profiling under UNIX.) The Mprof sampling signal handler records the current procedure call stack so that cache misses can be associated with specific "contextualized" procedure call paths. Mprof will, for example, report that foo2 incurs cache misses when called from foo1 called from main. Call path profiles are synthesized by feeding the call stack sample file produced by the handler into the Cpprof system which has facilities to highlight performance critical call paths and to interactively explore the data. Cpprof is discussed at length in Hall et al., "Call Path Profiling of Monotonic Program resources in UNIX," in Proceedings of 1993 Summer USENIX (1993), herein incorporated by reference in its entirety. An example is provided below which illustrates how user level Mprof profiles are viewed in Cpprof environment.

The inventors have found that Mprof's default call stack sampling signal handler 234 adequately isolates memory system bottlenecks. However, in more complex applications, the performance tuner may wish to replace the default handler with a specialized handler that records application specific information like arguments to a particular procedure or the state of some global state variable. Because the signal handler is part of the application program, it is considered to be well known in the relevant art to replace it with a user defined handler.

Below are examples of profiles produced using Mprof's system wide and user level sampling.

G. Case Studies

The case studies given below are intended to illustrate the basic functionality of the present invention implemented to profile memory system performance. To emphasize the key features of Mprof, stylized synthetic benchmarks have been used when performing these case studies rather than full application programs.

1. System Wide Sampling

This study examines the impact of multiprogramming on the effectiveness of the second level cache of the Sparc 10/41. In particular, the behavior of a particular application, cache_hog, which repeatedly reads all the elements of a 0.9 MB data structure is profiled. A script that spawns a single instance of cache_hog, waits for it to complete, and then starts up two concurrent invocations of the program is shown below.

cache_hog
sleep 1
cache_hog &
cache_hog;
sleep 15

The actual data is collected by enabling hardware sampling and record logging in the interrupt handler, running the test script, and then disabling sampling; the commands are:

start_profd; gen_workload; stop_profd.

Figure 3:
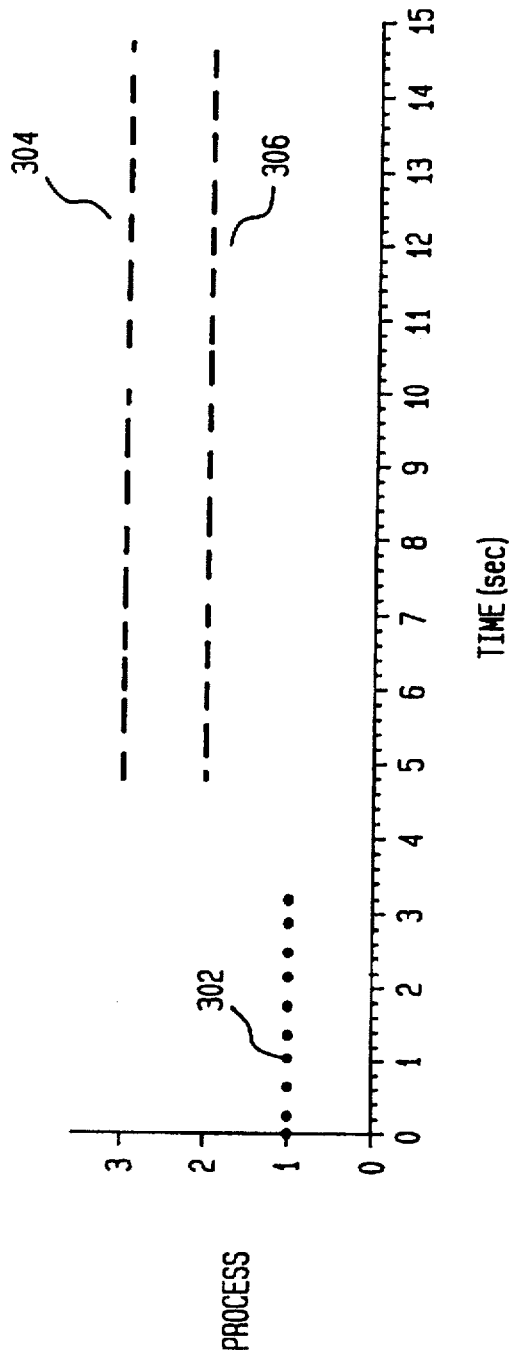
FIG. 3 is a per process cache profile for system-wide sampling of second level cache of a SUN Sparc 10/41.

In this example, Mprof has been configured to generate a profiling interrupt after 16384 read misses in the second level cache. On each profiling interrupt in system wide sampling mode, the handler logs a timestamp, the process id (PID), and the program counter (PC). Mprof uses the timestamps and PIDs to plot cache miss samples versus time for each process. FIG. 3 displays a plot for our test workload. In FIG. 3, the line 302 corresponds to the misses generated by the single invocation of cache_hog while lines 304 and 306 represent the misses of a pair of hogs sharing the machine. From FIG. 3, it is clear that the miss rates of the multiprogrammed jobs substantially exceed that of their uniprogrammed counterpart. In particular, there are 10 samples taken when the program runs alone but when two executions share the machine there are 75+77=152 samples. The additional misses are generated because the processes interfere in the cache, with each process flushing the other's data.

This phenomenon is not surprising, as each instance of cache_hog wants to use 90% of the lines in the second level cache. Mprof does, however, help us to visualize and quantify the effect. Moreover, the example illustrates how, over time, sampling correctly attributes misses to the processes that are incurring them. Note, however, that for multiprogrammed jobs, the samples seem to cluster into groups of four and five. This clustering is an artifact of poor sampling-for the purpose of illustration we have used a fixed sampling interval of 16384 misses. In any given 33 ms time slice, a process takes about 8000 second level cache misses. Thus, it is often the case that for a given time slice, we increment the miss counter by 8000 and then context switch so these misses are eventually charged to another process. In randomized sampling, such errors will tend to cancel, but in fixed interval sampling, correlations can arise producing the sort of clustering shown in FIG. 3. In the pathological case, the sampling rate and miss count per-time slice can be chosen such that all samples will hit in one of two processes that are in fact missing equally often. This possibility argues strongly for randomizing the sampling by varying the inter-sample interval.

Returning to the profile results, the sampled data not only identifies which processes are missing in the cache, but also which program counters are associated with these misses. By periodically executing the processor status command (ps) during the profiling run, Mprof records a mapping from PIDs to executable file names. During the post mortem data viewing phase, when the user clicks on one of the lines of the summary graph given in FIG. 3, Mprof exploits this record to map the PID corresponding to the line into an executable file name, extracts the symbol table from the file, and then synthesizes a procedure level cache miss profile from its sampled program counter information.

2. User Level Sampling in Cpprof

This case study illustrates Mprof's ability to relate data stall cycles to call paths, identifying regions of a program that map poorly onto the memory hierarchy. The case study compares several approaches to sorting a large array of records using the qsort library routine. This routine sorts an array of fixed size records given a pointer to the array, the size of a record, the number of records, and a function for comparing two records. On average, qsort performs NlogN compares when sorting N records; when two records are out of order they are swapped in place.

In this case study, the present invention operates on a 6 MB data set containing 200,000 32-byte records, each with a 4 byte integer key. As a base case, qsort is invoked on the full array of 32 byte records. This implementation is somewhat inefficient because qsort is comparing integer keys but swapping full 32 byte records. This unnecessary copying can be avoided by sorting pointers to records rather than the records themselves. Pseudo-code to initialize the pointer array and compare elements is shown below:

```
init_ptr_array(Record *rec, Record **record_ptr, int cnt) {
    for(i=0; i < cnt; i+=1)
        record_ptr[i] = rec + i;
```

-continued

```
}
compare_record_ptr(Record **rp1, Record **rp2) {
    return ( (*rp1)->key - (*rp2)->key);
}
```

The performances of the base case and record pointer sorts are compared by profiling both real time and data stall time via user-level sampling (real time signals are generated using the UNIX setitimer function). An excerpt from the Cpprof profile of the base case is shown below. Each line in the profile corresponds to a call path rooted at the qsort routine. Entries ending in %body% represent total time spent in a procedure body and entries ending in Data_Stall represent time spent stalled waiting for data. For example, the final call path in the profile below tells us that 0.62 seconds were spent waiting for data in the procedure compare_records when it was called from qsort.

```
format: Call Path [Time in Seconds]

(qsort % body %) [6.86]
(qsort Data_Stall) [1.98]
(qsort compare_records % body %) [1.40]
(qsort compare_records Data_Stall) [0.62]
```

Using the information in this profile, the first row of Table 2 is generated, which reports time the processor is active (CPU), time the processor is stalled waiting for data (DS) and total time. Note that the CPU figure is derived by subtracting DS from total time. Times are reported both for the qsort and compare routines individually and for qsort+compare. Looking at the qsort+compare columns, it is shown that eliminating the unnecessary copying by using the pointer sort saves 3.1 seconds of CPU time, but leaves data stall time unchanged. The likely explanation for this phenomenon is that the amount of data actually passing through the cache hierarchy is the same in both implementations. In the pointer based implementation, the comparison function dereferences a pointer to access the key field of a record. But since the primary cache has 32 byte lines, each reference to a key field causes the cache to load the entire 32 byte record.

The data bandwidth requirements can be reduced by building "little" records (LRecs) where each record contains only a pointer to a full database record and a copy of that record's key:

```
init_little_records(Record *rec, LRec *lrec, int cnt) {
    for (i=0; i < cnt; i+=1) {
        lrec[i].key = rec[i].key;
        lrec[i].record_ptr = rec + i;
    }
}
```

These 8 byte "little" records can then be directly sorted using qsort. In this case, qsort will be swapping 8 byte records and comparing 4 byte keys. The extra 4 bytes of copying can be eliminated by sorting pointers to the little records rather than the records themselves, as was done above for full records. The results for an LRec and LRec pointer implementation appear in the bottom two rows of Table 2. Examining the time spent in qsort, it is shown that reducing the copying from 8 to 4 bytes saves nearly a factor of two in CPU time there (1.2 vs. 2.5 sec). However, it increases the CPU time in compare (there is an extra pointer dereference) and it increases data stall time in both qsort and compare. This increase in data stall time is explained by the fact that the array of pointers to records increases the active data set size from 8 bytes per little record to 12 bytes. In the end, sorting the little records themselves is the superior approach, running about 2.5 times faster than sorting full records.

TABLE 2

| Version | qsort time (sec) | | | compare time (sec) | | | qsort + compare (sec) | | |
|---|---|---|---|---|---|---|---|---|---|
| | CPU | DS | Total | CPU | DS | Total | CPU | DS | Total |
| Full Sort | 4.9 | 2.0 | 6.9 | 0.8 | 0.6 | 1.4 | 5.7 | 2.6 | 8.3 |
| Rec. Pointers | 1.1 | 1.0 | 2.1 | 1.5 | 1.6 | 3.1 | 2.6 | 2.6 | 5.2 |
| LRec | 2.5 | 0.1 | 2.6 | 0.6 | 0.1 | 0.7 | 0.2 | 0.2 | 3.3 |
| LRec Ptr | 1.2 | 0.7 | 1.9 | 1.5 | 1.0 | 2.5 | 2.7 | 1.7 | 4.4 |

The availability of data stall cycle times significantly simplified the above optimization process. In particular, the data access stall time information given above focused the attention of the inventors on reducing data movement in the full record pointer implementation. Also, in the LRec and LRec pointer implementations, there was a trade-off between CPU time and data stall time, and explicit measures of both quantities allowed us to understand this trade-off. It is extremely difficult to understand such trade-offs without the sort of empirical data that Mprof provides. Note also that this example only touches on the combined functionality of Mprof/Cpprof. In the full system, the user currently has access to Mprof derived first and level cache miss information and data pipeline stall cycles as well as to Cpprof's real time, user time, and page fault profiles. In addition, Cpprof provides an interactive shell for synthesizing different types of profile (function body, body+descendants, upward or downward call path) and relating program data to various subsets of the nodes in a program's dynamic call graph. In summary, the stack samples produced by Mprof fit naturally into an advanced profiling environment.

H. Alternative Embodiments

The above case studies identify the type of information Mprof can extract. There are several features of Mprof which can be implemented to improve and extend its performance. For example, currently, the system state which is sampled is of a "code-centric" nature. That is, in both system-wide sampling and user level call path sampling, a program counter or set of program counters is being recorded. This data allows one to identify where in the code the memory system performance is poor, but it does not directly record what data structures are at fault. By also recording the virtual address of the cache miss that triggers the sampling interrupt, one could get a crude profile of hot spots in the data. To create user level profiles from this data, however, the virtual addresses must be related back to user level data structures. Techniques for accomplishing such mappings are discussed in Martonosi et al., "MemSpy: Analyzing Memory System Bottlenecks in Programs," in Proceedings of ACM SIGMETRICS Conference on Measurement and Modeling of Computer Systems (1992), pp. 1–12, herein incorporated by reference in its entirety.

Sampling works well for long running programs where we can sample relatively infrequently and still accumulate enough samples to develop an accurate histogram of where performance is poor. However, in some circumstances a more fine-grained view may be required. For example, after obtaining a coarse sampled profile of a multithreaded application, a programmer may want to focus on a specific procedure in a single thread. To better support such fine-grained profiling, we can add an enable bit to each Mprof counter such that the counter only increments when the enable bit is set. To determine the number of cache misses (or miss stall time if stall detectors are implemented) in a procedure, loop, or basic block, the program is as follows:

```
When program execution begins, InitialValue=read(counter0,enable=0.
   On entering the code segment, enable=1.
   On exiting the code segment, enable=0.
   On program exit, read the counter and subtract off InitialValue.
```

Counter overflow is handled by recording the number of overflow interrupts that the counter generates. Note, this technique still has the problem that when a context switch occurs while executing an instrumented code segment, cache misses in other processes will be attributed to the instrumented code. As mentioned above, the operating system must maintain the state of the enable bit on a per process basis to avoid this problem.

I. Other Monitoring Applications

There are several natural extensions of the performance monitor 100 of the present invention as described above. One important extension is to instrument more of the memory hierarchy to provide better insight into where bottlenecks arise. In particular, this approach would distinguish between the sources of memory overhead in today's processors, including translation lookaside buffers, on-chip instruction and data caches, and write buffers. Since this information lies within the microprocessor, hidden from external probes, chip vendor support is required for such profiling.

It should be noted that the sampling monitor technique of the present invention may also be applied to multiprocessor systems. This is particularly significant because parallel programs with many interacting threads are easily perturbed by intrusive instrumentation techniques. Because sampling interrupts are relatively infrequent, the present invention is well-suited to the multiprocessor domain.

1. Network Monitoring a. Introduction

Another application of the present invention is in distributed systems where multiple processors connected by a communication network interact to solve a problem such as workstations connected by a high speed network. The most important feature which must be considered when optimizing system performance in this environment is understanding the interactions between the cooperating processors. The present invention is a network monitoring system that addresses this profiling problem in an inexpensive, nonintrusive, and general purpose manner. This approach offers significant advantages over previous software instrumentation methods (that perturb program performance) and hardware monitors (that lack flexibility and generality).

When used as a network monitor, the user must specify the conditions under which an interrupt is generated. By appropriately programming the monitor we can nonintrusively determine where and how a system is waiting for data from the network, when network utilization is high or low, and where a program is generating significant network traffic.

b) Detecting Synchronization Overhead

In any distributed system, one process may be waiting for another process to produce data. The problem is particularly serious because the effects of waiting may be cumulative. Processor A waits for data from B, which waits for data from C which may eventually slow down A. The conventional software approach to measuring synchronization overhead would require a clock before and after every network read to accumulate how long the program spends waiting for data to arrive. In fine-grained networks where network packets can be as small as a single word, the overhead of these software clock accesses can dominate the actual data reading time, perturbing the system and eliminating the waiting times we are trying to monitor.

The conventional hardware approach often used to circumvent this problem is to maintain a counter on the network board that accumulates read wait time. This approach allows us to determine the total time a program spends waiting on network reads, but it does not tell us when during the program's execution it was waiting so it is difficult to isolate the problem.

The approach of the present invention combines the read wait time counter with an interrupt generator. In the simplest case, the user can specify the value of a compare register and an interrupt is generated every time the read wait time counter reaches the compare value. The interrupt is then used by system software to record aspects of the program's state. By default the interrupt handler can record the current procedure call stack, though we may customize the handler to record application specific state. This interrupt-based sampling technique has been used in the past to relate consumption of CPU time to program state, but it has not been applied more generally to resource classes like network read wait time or cache miss service time.

c) Understanding Synchronization Overhead

The present invention may also be used to gain information about the distribution of wait times on the network. For example, it would be useful to know how many long waits there were compared to the number of shorter waits. To perform this function a configuration similar to that shown in FIG. 2 can be used to accumulate individual wait times in specific ranges. The user programs the ranges and hardware interrupts whenever one of the ranger counters 204A,204B reaches its compare value in comparator 205A,205B, respectively. Note, even a single extent detector/counter pair is of substantial use in practice as the programmer often wants to distinguish whether synchronization overhead derives from a few long message waits or many short waits.

d) Resource Utilization

The present invention can easily support traditional measurements like number of network transactions and network utilization. But, due to the triggered interrupting capability, the present invention can relate these measurements to system state with little overhead. The present invention simply interrupts the program every time N units of resource are accumulated and record the program state. It is preferred that the present invention be configured to sample at random intervals with mean N units to avoid correlation problems. Obtaining similar data by incrementing software counters on every network transaction would perturb the system, potentially changing the relative execution time of events on different processors, and affecting total system performance in an unpredictable way. Traditional hardware counters without an interrupting capability would also be inadequate because they do not provide a mechanism for relating resource usage to specific resource users.

2. Additional Applications

Finally, the monitor has applications beyond profiling and optimization.

Debug operations: The counters and decoder structures can be used to aid in debugging code that uses the communication system. For example, a count can be kept of the number of transmissions to and receives from each of the other processors in the system and this can be used to detect when and if the communication system becomes unsynchronized or deadlocked.

Sanity and error checking: The monitor can be used to detect error conditions. For example, if it is known that no more than ten successive writes are done to a particular channel in a given time, it is possible to program the monitor to alert the processor if this rule is ever violated.

3. Network Interface Example

In this example, a network interface is considered which exists as a card in a workstation and allows the workstation to communicate using messages with the network. The waiting time, number of messages and the rate of communication can be monitored easily. Waiting time is monitored by counting the number of clock ticks that occur when the network is blocked and message rate is monitored by measuring the number of messages that are communicated in a given number of clock ticks. To illustrate how these measures are useful, an analog circuit simulation is used as an example program. Circuit simulation has two main phases, the construction of a set of equations representing a circuit (model evaluation), and their solution. The equations describing each element of the circuit (model equations) can be evaluated to determine the coefficients of the equations describing the entire circuit. Such evaluations can be performed independently and their results accumulated to derive the coefficients of the circuit equations. These coefficients are stored in matrix form. The resulting matrix and a vector of variables define the set of equations representing the circuit. These equations can be solved using well known Lower Upper Decomposition (LUD). The LUD algorithm can be implemented on a parallel machine by first representing the LUD operations of row normalization, row update and element backsubstitution, as tasks in a task graph. These tasks can then be scheduled on a machine with several processors. The results of a task may be needed by tasks on other processors. The tasks and communications must be sequenced to insure that when a task is executed on a processor it has all the pertinent information the task needs to complete. The total LUD time is determined by the waiting time to access the network, time for communicating the data needed and the task execution time. A good schedule minimizes this total time.

The waiting time for the communication network is important during the LUD phase because the total compute time is dependent on minimizing the total waiting time. A poorly sequenced task list will have a large waiting time because tasks that could otherwise execute have to wait for communications from other processors to communicate their results. Because our monitor counts events without perturbing the operation of the program it is possible to get an accurate value of the wait time. If the monitor is set to interrupt when the wait time exceeds a predetermined threshold the parts of the program that are causing the most wait time can be identified easily.

The number of communications is important during model evaluation if the model equations are distributed to processors dynamically, depending on the computation load of a given processor. An unfavorable situation may arise if many communication intensive models are assigned to one processor. If conventional software monitoring techniques are used then the execution of the monitoring software may change the assignment of model equations to processors and therefore would perturb the communications that occur.

The rate of communication is also important in model evaluation. In a multiprocessor environment model equations need to communicate their results with the processor that holds the matrix. Such communications can be interleaved with the model computation. If the amount of communication produced during device model evaluations exceeds the capacity of the network then the processors may stall waiting for the network to clear. By monitoring the rate of communications it is possible to identify the processors and parts of the programs sending data that cause these high rate.

4. Output Queue Examples

In this example we consider several workstations communicating with each other using a network interface card with a finite queue. When the queue is full communications cannot take place and the processor will stall. A monitor can be used to detect when the queue is full. The problem might be solved by interleaving other operations with the communications in this part of the program so that the communications occur less frequently.

a) Network Blocking Detection

It is important to know how much time an application is spending waiting to use a communication resource. This situation can occur when the communications of several processes running on a processor conflict with each other. Communication conflicts can be detected by monitoring the total wait time and comparing this with the wait time when the program is run using a network without any other load. A software monitor would perturb the execution time of the processes and therefore give an inaccurate time. The problem is exacerbated if the communications are frequent and small, then the monitoring software overhead has a greater effect as its execution time becomes a greater fraction of the total execution time of the original program. A hardware monitor will be able to monitor this blocking time without being intrusive, and only interrupt the processor when a significant wait time has elapsed, reducing the percentage of time spent in the monitoring software.

b) Platforms

We have described how the monitor would be used in an environment with many processors communicating using a communication network. The monitor can be applied in many other cases as well. For instance, it can be used in a uniprocessor to unobtrusively monitor many aspects of the system's performance such as disk access. It can also be applied in multiprocessor systems for any type of interconnection network. The idea is not just restricted to workstations it can be used in PCs and in mainframes alike.

While various embodiments of the present invention have been described above, it should be understood that they have been presented by way of example, and not limitation. Thus, the breadth and scope of the present invention should not be limited by any of the above-described exemplary embodiments, which should be defined only in accordance with the following claims and their equivalents.

What is claimed is:

1. A system for profiling the behavior of memory systems in a processor, comprising:

an event detector configured to generate a detection signal upon an occurrence of a predetermined data stall time event;

a counter, coupled to said event detector, configured to receive and count occurrences of said detection signal received from said event detector, said counter further configured to generate a pulse signal when a predetermined count value of said detection signal occurrences is reached;

an interrupt generator, coupled to said counter, configured to generate a profiling interrupt signal upon receipt of said pulse signal; and an interrupt handler residing in the processor, configured to record a state of the processor relating to the memory access data stall time event upon receipt of said profiling interrupt signal generated by said interrupt generator.

2. The system of claim 1, wherein said event detector, said interrupt generator, and said counter are implemented in one or more programmable array, logic chips.

3. The system of claim 1, wherein said counter is a down counter, said down counter generating said pulse signal when said count value is zero.

4. The system of claim 1, wherein said counter is loadable counter, said loadable counter being selectively reset by said interrupt handler at least during one run of a single currently executing process.

5. The system of claim 1, wherein the memory system resides in a Sun SPARC 10/41 workstation.

6. The system of claim 1, wherein said event detector monitors a memory bus and outputs said detection signal when a main memory read signal is received to detect second level cache misses.

7. The system of claim 1, wherein said counter comprises a reset input configured to enable an external reset signal to reset said down counter.

8. The system of claim 1, wherein said counter comprises an enable input configured to enable an external enable signal to enable said down counter.

9. The system of claim 1, wherein said event detector detects data cache stall time, said counter counting a number of clock cycles during which said event detector receives a cache stall signal, said cache stall signal having a predetermined value when the processor is waiting on a data cache.

10. The system of claim 1, wherein said event detector detects primary cache misses and second level cache misses.

11. The system of claim 1, wherein said counter further comprises an enable input, said counter configured to count said event when said enable bit is set.

12. A performance monitor system for simultaneous profiling of multiple conditions in a processor memory system, comprising:

a plurality of condition detectors, each of said plurality of condition detectors configured to monitor a predetermined data stall time condition and to generate a detection signal upon an occurrence of said predetermined condition;

a plurality of counters, each of said plurality of counters coupled to a respective one of said plurality of condition detectors, for receiving said detection signal and for generating a count signal indicating the number of said detection signals received;

a plurality of loadable compare registers, each of said plurality of loadable compare registers coupled to a respective one of said plurality of counters, configured to receive said count signal from said respective counter and for comparing said count signal to a predetermined value loaded in said each of said plurality of compare registers;

an interrupt generator, coupled to each of said plurality of comparators, configured to generate a profiling interrupt signal based upon a predetermined relationship between said pulse signals received from said plurality of comparators; and an interrupt handler, residing in the processor, configured to record a state of the processor relating to the memory access data stall time event upon receipt of said profiling interrupt signal generated by said interrupt generator.

13. The system of claim 12, wherein the performance monitor is implemented in a field programmable gate array.

14. The system of claim 12, wherein each of said plurality of counters comprises an enable input, said enable input enabling each of said plurality of counters to count said event when said enable bit is set.

15. A method for profiling the behavior of memory systems in a processor, comprising:

generating a detection signal upon an occurrence of a predetermined data stall time event;

counting occurrences of said detection signal received from said event detector, and generating a pulse signal when a predetermined count value of said detection signal occurrences is reached;

generating a profiling interrupt signal upon receipt of said pulse signal; and recording a state of the processor relating to the memory access data stall time event upon receipt of said profiling interrupt signal.

* * * * *